Sept. 21, 1965
V. P. TUCKER ETAL
3,207,595
PRILLED MIXED FERTILIZERS
Filed Jan. 2, 1963
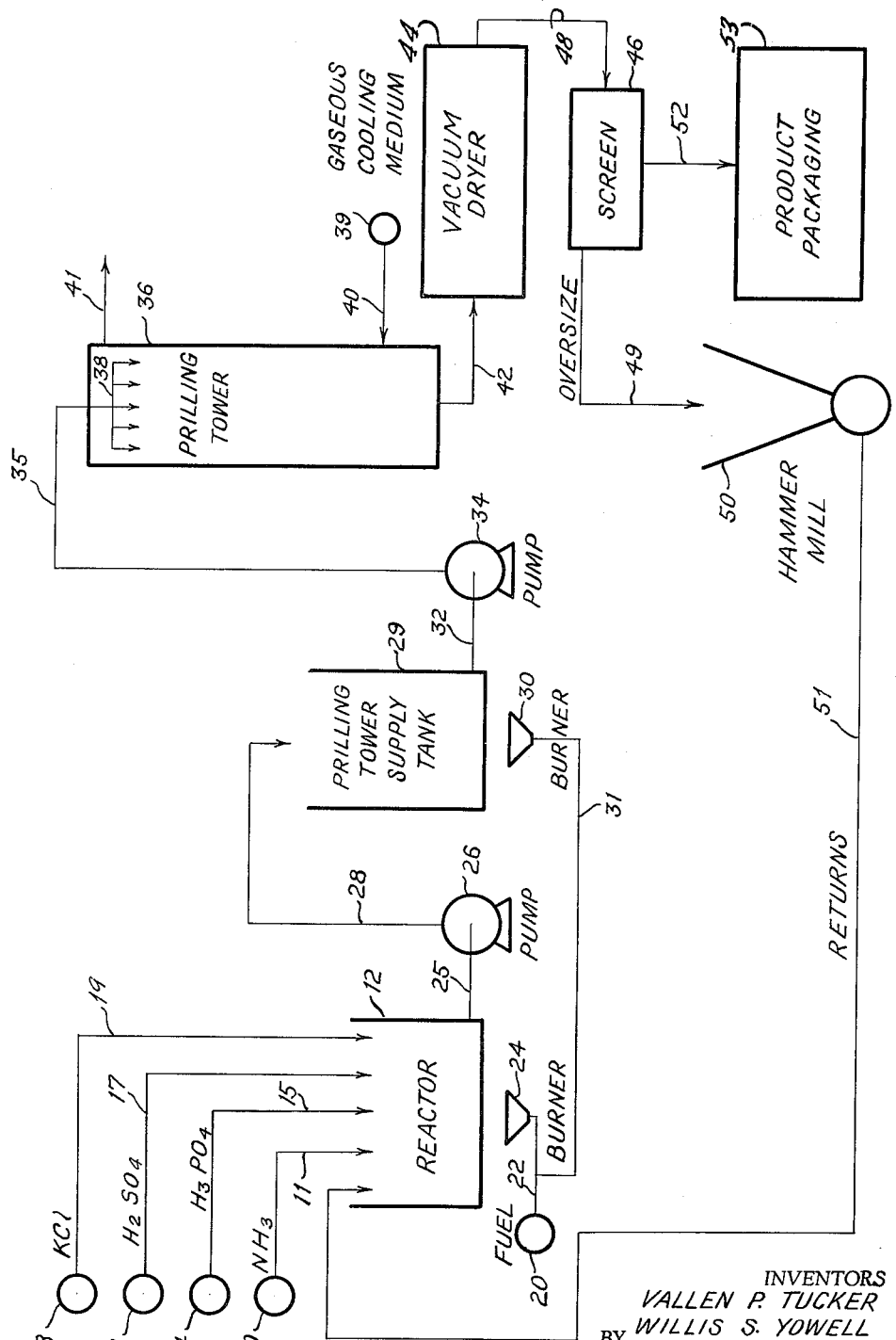
INVENTORS
VALLEN P. TUCKER
BY WILLIS S. YOWELL
Thomas J. Moran
ATTORNEY United States Patent Office 3,207,595
Patented Sept. 21, 1965

3,207,595
PRILLED MIXED FERTILIZERS
Vallen P. Tucker, Madison Township, Morris County, and Willis S. Yowell, Fanwood, N.J., assignors, by mesne assignments, to The American Agricultural Chemical Company, New York, N.Y., a corporation of Delaware
Filed Jan. 2, 1963, Ser. No. 248,921
1 Claim. (Cl. 71—51)

This invention relates to fertilizers, particularly prilled mixed fertilizers. More particularly, this invention relates to prilled mixed fertilizers having homogeneously admixed nitrogen-containing and phosphorus-containing compounds. In accordance with a specific embodiment this invention is directed to prilled mixed fertilizers having homogeneously admixed nitrogen-containing, phosphorus-containing and potassium-containing compounds.

Prilled ammonium nitrate has long been employed as a nitrogen-containing fertilizer. Prilled ammonium nitrate has been admixed with other fertilizer components such as phosphorus-containing compounds to form so-called granular mixed fertilizers. Also, a fluent admixture of ammonium nitrate and monoammonium phosphate has been prilled to form a two component, mixed fertilizer.

Three component, mixed fertilizers are conveniently designated in the trade by the representation A-B-C wherein A is a number representing the percent by weight nitrogen in the mixed fertilizer, B is a number representing the percent by weight phosphorus measured as phosphorus pentoxide in the mixed fertilizer and C is a number representing the percent by weight potassium measured as potassium oxide in the mixed fertilizer. The representation A-B-C also, accordingly, represents the relative proportions in parts by weight of these materials in the mixed fertilizer.

A mixed fertilizer in prilled form, stable and containing nitrogen, phosphorus and preferably potassium fertilizer components is commercially desirable.

It is an object of this invention to provide improved prilled, mixed fertilizers.

Another object of this invention is to provide an improved, prilled, homogeneous, three component, nitrogen-containing, phosphorus-containing and potassium-containing mixed fertilizer.

Another object of this invention is to provide a process for the manufacture of improved prilled, two or three component fertilizers.

How these and other objects of this invention are achieved will become apparent in the light of the accompanying disclosure made with reference to the accompanying drawing which schematically illustrates a process flow in accordance with this invention.

In accordance with this invention there is provided a prilled, substantially anhydrous, homogeneously admixed, mixed fertilizer consisting essentially of a nitrogen-containing fertilizer component, a phosphorus-containing fertilizer component and, if desired, a potassium-containing fertilizer component. Still more particularly, in accordance with one embodiment of this invention there is provided a prilled, stable, substantially anhydrous, homogeneous three component fertilizer admixture consisting essentially of nitrogen-containing, phosphorus-containing and potassium-containing fertilizer components, said fertilizer components being inorganic, readily water-soluble compounds and being present in said admixture in amounts such that the parts by weight nitrogen due to said nitrogen-containing component and the parts by weight phosphorus measured as available phosphorus pentoxide present in said admixture due to said phosphorus-containing component and the parts by weight potassium measured as potassium oxide due to said potassium-containing component are in the approximate proportions 1-2:1-4:0-2, respectively, e.g. 1:3:0; 1:2.5:0; 1:4:0; 1:2.5:1; 1:2.5:2: 1:3:1; 1:3:2: 1:1:1 and 1:2:1, such as fertilizers analyzing 16–48–0; 18–46–0; 8–32–16 and 10–40–10.

More particularly, in the prilled, homogeneous, mixed fertilizers prepared in accordance with this invention the nitrogen-containing component is an inorganic, water-soluble nitrogen-containing compound, such as ammonium sulfate, monoammonium phosphate, diammonium phosphate, or mixtures thereof. The phosphorus-providing component is an inorganic, water-soluble phosphorus-containing compound, such as mono-ammonium phosphate, diammonium phosphate, a potassium phosphate, such as $KH_2PO_4$, $K_2HPO_4$ or mixtures thereof. Also, when present, the potassium-containing component is an inorganic, water-soluble potassium salt, such as potassium sulfate, potassium carbonate, a potassium phosphate, such as monopotassium phosphate, and, less desirably, potassium chloride or mixtures thereof.

In the preparation of the prilled, three component, nitrate-free and preferably chloride-free, mixed fertilizers of this invention, various readily water-soluble, inorganic, nitrogen-containing compounds or mixtures of compounds may be employed. Particularly suitable as the precursor of the nitrogen-containing fertilizer component is anhydrous ammonia or aqueous ammonia solutions. Other nitrogen-containing, inorganic compounds are also useful, such as ammonium sulfate, monoammonium phosphate, diammonium phosphate and mixtures thereof. Useful as a phosphorus-containing component in the preparation of prilled, mixed fertilizers of this invention are the readily water-soluble phosphorus-containing compounds, such as mono-ammonium phosphate; diammonium phosphate and the like and mixtures thereof. Also useful as the precursor of the phosphorus-containing fertilizer component is phosphoric acid, furnace or wet process phosphoric acid, which upon reaction with such compounds as ammonia, ammonium hydroxide, potassium hydroxide and potassium carbonate form the corresponding phosphorus-containing salts, such as $NH_4H_2PO_4$, $(NH_4)_2HPO_4$, $KH_2PO_4$ and $K_2HPO_4$. Advantageously, a mixture of acids, phosphoric and sulfuric acids, is employed so that upon reaction with alkaline acting materials, such as anhydrous ammonia, ammonium hydroxide of a base, the corresponding phosphate and sulfate salts are formed.

Useful as the potassium-containing component in the preparation of prilled, mixed fertilizers of this invention are the readily water-soluble, inorganic potassium-containing compounds, such as potassium sulfate, potassium carbonate and the potassium phosphates, such as monopotassium phosphate and the like and mixtures thereof. Also useful as precursors of the potassium-containing fertilizer component are such potassium compounds as potassium hydroxide and potassium carbonate which react with phosphoric acid and/or sulfuric acid to yield the corresponding potassium salts.

The prilled, mixed, stable, chloride-free, nitrate-free fertilizers of this invention are prepared from substantially homogeneous, fluent admixtures of nitrogen-containing and phosphorus-containing compounds, such as a fluent admixture containing monoammonium phosphate, diammonium phosphate and ammonium sulfate. If desired, a potassium salt, such as $K_2SO_4$, may be added to provide the third, potassium, fertilizer component. Such admixtures are made fluent by being formed at a relatively elevated temperature, such as a temperature in the range 230–250° F. For example, a fluent admixture of monoammonium phosphate, diammonium phosphate and ammonium sulfate, having a moisture content in the range 16–24%, is formed by reacting anhydrous ammonia with a mixture of phosphoric and sulfuric acids.

The thus-formed fluent admixture at a temperature in the range 230–250° F. or lower is then introduced into contact with a gaseous cooling medium as by spraying or dropping through a cooling or prilling tower or by spraying or jetting into a substantially horizontal trajectory to effect solidification of the sprayed admixture and the resulting formation of prills. The resulting material is then dried to remove excess moisture, screened to the proper size and then, if desired, coated with various coating agents, such as diatomaceous earth, limestone and the like and packaged. Any oversize and undersize prilled material is advantageously returned to form additional fluent admixture. The drying operation is carried out in a vacuum dryer, such as a steam jacketed, double cone vacuum dryer.

Referring now to the drawing which schematically illustrates the practice of this invention as applied to the manufacture of a prilled, nitrate-free, three component fertilizer, such as a 1:1–4:1 fertilizer, e.g. a mixed fertilizer analyzing 14% by weight nitrogen, 40% by weight phosphorus and 10% by weight potassium measured as potassium oxide, an amount of anhydrous ammonia is supplied from a suitable source 10 via conduit 11 to reactor 12. Prior to the introduction of the anhydrous ammonia into reactor 12, phosphoric acid from a suitable source 14 is supplied to reactor 12 via line 15. Also, an amount of sulfuric acid from source 13 is supplied via line 17 to reactor 12. Desirably, the anhydrous ammonia is introduced via conduit 11 beneath the surface of the phosphoric acid within reactor 12. The addition of the ammonia is carried out over an extended period of time, such as in the range 0.5–2 hours, preferably about 0.75 hour but as fast as possible without causing undue ammonia losses.

The resulting reaction mixture comprising monoammonium phosphate, diammonium phosphate, ammonium sulfate and water is then heated and particle-form potassium chloride from a suitable source 18 is added via line 19 to the reaction mixture in reactor 12. Heating of the resulting admixture within reactor 12 is effected by any suitable means, such as by supplying a gaseous fuel, e.g., natural gas, from a suitable source 21 via conduit 22 to burner 24 positioned beneath reactor 12. The heat of combustion of the fuel within burner 24 serves to heat the admixture within reactor 12 to a desired temperature, such as a temperature in the range 265–285° F. The reaction mixture within reactor 21 is adjusted to a solids content analyzing 40.5% monoammonium phosphate, 27.9% diammonium phosphate, 14.9% ammonium sulfate and 16.5% potassium chloride, all percents being percents by weight.

The resulting hot, fluent admixture is supplied from reactor 12 via line 25 to pump 26 and is pumped via conduit 28 to prilling tower supply tank 29. The fluent admixture within supply tank 29 is maintained at the desired elevated temperature above its solidification temperature by means of burner 30 which is also supplied with fuel via lines 22 and 31.

Hot, fluent admixture from supply tank 29 at a temperature in the range 265–285° F. is supplied via line 32 to pump 34 and pumped via conduit 35 to the top of prilling tower 36. At about the top of prilling tower 36 the hot, fluent admixture in conduit 35 is sprayed via spray head 38 into the top of prilling tower 36. The thus-sprayed fluent admixture falls downwardly within prilling tower 36 in direct countercurrent contact with a gaseous cooling medium therein. As illustrated, the gaseous cooling medium may be any gas inert with respect to the fluent admixture sprayed into prilling tower 36 via spray head 38. A suitable inert gaseous cooling medium includes such gaseous materials as nitrogen, carbon dioxide, flue gas and air, particularly air having a substantially reduced oxygen content, and mixtures thereof. As illustrated, the gaseous cooling medium from a suitable source 39 is introduced into the bottom of prilling tower 36 via conduit 40 and exits from the top of prilling tower 36 via conduit 41.

As the sprayed fluent admixture falls downwardly within prilling tower 36 the sprayed admixture solidifies and prills are formed. These prills, analyzing about 9% by weight $H_2O$, are removed from the bottom of prilling tower 36 via conduit 42 and supplied to vacuum dryer 44 for drying. The dried, substantially anhydrous (moisture content below 1%) prilled material from dryer 44 is supplied via conduit 48 to screen or size separation unit 46. The oversize material from screen 46 is removed via conduit 49 to hammermill or other suitable size reduction unit 50 wherein it is reduced in size and returned via conduit 51 to reactor 12 for the preparation of additional fluent admixture.

The screened, prilled material of satisfactory size is removed from screen 46 via line 52 and supplied to product packaging unit 53 wherein it is, if desired, coated with suitable coating agents, such as diatomaceous earth, limestone, gypsum, siliceous materials and the like, which may or may not contain trace elements, such as manganese, cobalt, copper and the like therein, and packaged for shipment as product.

In the practice of this invention the solid materials, such as the potassium-containing fertilizer component or its precursor, e.g. potassium carbonate, potassium chloride or potassium sulfate, added to reactor 12 are preferably finely-divided and have a particle size smaller than 60 mesh. The prilling tower is of any suitable size effective such that the fluent admixture sprayed into the top of the tower as its falls therein is substantially solidified when it reaches the bottom of the tower. A prilling tower having a height of about 100 feet, more or less, is satisfactory in most instances.

Chloride-free, nitrate-free, prilled, mixed three component fertilizers are particularly preferred. Such fertilizers are thermally stable and substantially hazard free due to the absence of nitrate and are particularly suitable as water-soluble, high analysis fertilizers substantially free of the danger of inducing salt intoxication in plants or soil dut to accumulation in the soil.

Although in the practice of this invention as described with reference to the drawing a mixture of acids, phosphoric acid and sulfuric acid, was employed for reaction with the ammonia, preferably anhydrous ammonia, for the formation of the nitrogen-containing and phosphorus-containing components of the prilled fertilizers, instead of a mixture of acids, phosphoric acid or sulfuric acid, alone, may be reacted with the ammonia to yield the corresponding reaction products $NH_4H_2PO_4$ and $$(NH_4)_2HPO_4$$

or $(NH_4)_2SO_4$ respectively. When only one of these reaction products is formed by reacting ammonia with the corresponding acid, the other can be added to the reaction mixture as the compound per se or mixture of such compounds in the amount and proportion desired in the final prilled, mixed fertilizer.

Further, the use of an acid, if desired, may be dispensed with entirely or at least in part, in which event all the fertilizer components are added as the respective chemical compounds in the amounts and proportions desired in the final prilled product. In this embodiment sufficient water is also admixed with these compounds so as to yield a fluent, prillable admixture.

Also, although the invention is described with reference to the drawing as employing an elongated prilling tower it is pointed out that structurally, as such, a prilling tower may, if desired, be omitted and replaced by suitable means, such as a nozzle capable of projecting the prillable admixture into a trajectory through space in contact with a suitable gaseous cooling medium so that upon impact at the end of the trajectory the projected material has solidified to a prill.

Further, if desired, the fluent admixture can be prilled by passing a spray or droplets of the fluent, prillable admixture through a body of relatively cool liquid which is inert with respect to the admixture and which, preferably, has substantially no solvent power for the admixture. Suitable liquids include the anhydrous alcohols, e.g. isopropanol, the butanols, the ketones, such as methyl ethyl ketone, methyl isobutyl ketone, methyl propyl ketone, the esters, such as propyl acetate, the various hydrocarbons, either substantially pure hydrocarbons or petroleum fractions, such as mineral oil, kerosene and the like. The liquid employed desirably should be readily recoverable from the admixture prilled and solidified therein. By employing a liquid to effect prilling the size of the prilling tower can be drastically reduced, from a tower or apparatus affording a prilling or cooling path of about 50–100 feet, more or less, to a tower or prilling apparatus having a body of liquid in an amount affording a prilling path of a few feet, such as 1–5 feet, more or less.

Illustrative of this feature of the invention, drops of molten reaction admixture containing a suitable fertilizer component, specifically potassium ammonium phosphate, were introduced into a body of mineral oil. There were recovered glass-like prills of this fertilizer component. Also, drops of this molten reaction admixture were added to a body of liquid isopropanol and there were recovered white prills of this fertilizer component. The prills formed and recovered from these operations resembled transparent glass beads and were commercially attractive as a fertilizer product.

Although numerous nitrogen-containing, phosphorus-containing and potassium-containing inorgaic compounds and mixtures thereof have been disclosed as being suitable for use in the preparation of the prilled, mixed fertilizers described herein, it is preferred in the preparation of these prilled, mixed fertilizers to avoid the use of sodium-containing inorganic compounds, such as $NaH_2PO_4$, particularly in substantial amounts or proportions. It has been found that sodium salts have an adverse affect on the melts. Accordingly, it is preferred in the practice of this invention to prepare the three component, mixed fertilizers without employing any sodium-containing compounds as contributing to the nitrogen-containing, phosphorus-containing and potassium-containing components of the admixture.

As will be apparent to those skilled in the art in the light of the foregoing disclosure, many modifications, alterations and substitutions are possible in the practice of this invention without departing from the spirit or scope thereof.

We claim:

A prilled substantially anhydrous, nitrate-free, homogeneous readily water-soluble fertilizer composition consisting essentially of about 40.5% by weight monoammonium phosphate, about 28% diammonium phosphate, about 15% ammonium sulfate and about 17% potassium chloride, said composition analyzing approximately 14–40–10 wherein 14 is the percent by weight nitrogen in said fertilizer composition, 40 is the percent by weight phosphorus measured as phosphorus pentoxide in the fertilizer composition and 10 is the percent by weight potassium measured as potassium oxide in the fertilizer composition.

References Cited by the Examiner
UNITED STATES PATENTS

| | | | |
|---|---|---|---|
| 2,804,383 | 8/57 | Pike | 71—64 |
| 2,893,858 | 7/59 | MacDonald et al. | 71—64 |
| 2,902,342 | 9/59 | Kerley | 71—43 |
| 2,939,781 | 6/60 | Gilliam | 71—64 |
| 3,021,207 | 2/62 | Stengel | 71—64 |
| 3,026,193 | 3/62 | Baynham | 71—64 |
| 3,037,855 | 6/62 | Smith | 71—64 |
| 3,048,887 | 8/62 | Weiland | 71—64 |
| 3,049,419 | 8/62 | Raistrick et al. | 71—64 |
| 3,050,385 | 8/62 | Parker | 71—64 |

DONALL H. SYLVESTER, *Primary Examiner.*

ANTHONY SCIAMANNA, *Examiner.*